United States Patent
Fischer et al.

[11] Patent Number: 6,152,484
[45] Date of Patent: Nov. 28, 2000

[54] GAS GENERATOR

[75] Inventors: Anton Fischer, Leinweiler; Martin Seitz, Schwäbisch Gmünd, both of Germany

[73] Assignee: TRW Occupant Restraint Systems GmbH & Co. KG, Alfdorf, Germany

[21] Appl. No.: 09/235,968

[22] Filed: Jan. 22, 1999

[30] Foreign Application Priority Data

Jan. 23, 1998 [DE] Germany .................. 298 01 104 U

[51] Int. Cl.$^7$ .................................................. B60R 21/26
[52] U.S. Cl. ...................... 280/736; 280/730.2; 280/740; 222/3
[58] Field of Search ................... 280/730.2, 736, 280/740, 742, 741, 728.2, 737; 222/3; 285/132.1, 124.1, 179, 188, 420

[56] References Cited

U.S. PATENT DOCUMENTS

| | | | |
|---|---|---|---|
| 686,311 | 11/1901 | Leaycraft | 285/132.1 |
| 844,020 | 2/1907 | Hoffman et al. | 285/132.1 |
| 2,166,078 | 7/1939 | Stephenson | 285/132.1 |
| 2,527,359 | 10/1950 | Guth | 222/3 X |
| 2,605,848 | 8/1952 | Carter | 222/3 X |
| 3,308,494 | 3/1967 | Licher | 222/3 |
| 3,406,988 | 10/1968 | Jones | 285/132.1 |
| 3,674,059 | 7/1972 | Stephenson | 280/737 X |
| 3,711,115 | 1/1973 | Lohr . | |
| 3,731,948 | 5/1973 | Risko | 280/741 |
| 3,770,387 | 11/1973 | Loomba . | |
| 3,777,772 | 12/1973 | Arnold et al. | 280/737 X |
| 3,829,124 | 8/1974 | Charns et al. | 280/737 |
| 3,887,109 | 6/1975 | Libkie | 222/3 |
| 4,013,305 | 3/1977 | Ichihara | 222/3 X |
| 4,367,769 | 1/1983 | Bain | 285/132.1 X |
| 4,431,117 | 2/1984 | Genbauffe et al. | 222/3 |
| 4,830,060 | 5/1989 | Botsolas | 285/132.1 X |
| 4,878,690 | 11/1989 | Cunningham | 280/741 |
| 5,007,664 | 4/1991 | Mann | 285/132.1 |
| 5,316,336 | 5/1994 | Taguchi et al. | 280/730.2 X |
| 5,364,125 | 11/1994 | Brown et al. | 280/736 X |
| 5,564,739 | 10/1996 | Davidson | 280/736 |
| 5,593,180 | 1/1997 | Cuevas et al. | 280/741 |
| 5,605,346 | 2/1997 | Cheung et al. | 280/730.2 X |
| 5,681,056 | 10/1997 | Levosinski | 280/736 X |
| 5,690,354 | 11/1997 | Logan et al. | 280/730.2 X |
| 5,779,269 | 7/1998 | Moore et al. | 280/741 |
| 5,806,884 | 9/1998 | Johnson et al. | 280/736 |
| 5,829,783 | 11/1998 | Ishikawa et al. | 280/736 |
| 5,833,266 | 11/1998 | Bartoldus et al. | 280/730.2 X |
| 5,884,937 | 3/1999 | Yamada | 280/730.2 |
| 5,899,485 | 5/1999 | Folsom et al. | 280/736 X |
| 5,979,930 | 11/1999 | Berger | 280/741 X |

*Primary Examiner*—Lanna Mai
*Assistant Examiner*—Ruth Ilan
*Attorney, Agent, or Firm*—Tarolli, Sundheim, Covell, Tummino & Szabo L.L.P.

[57] ABSTRACT

A gas generator including a housing, at least one pipeline connected to the housing and directing generated gas to an airbag, a coupling piece which connects the housing with the pipeline, and at least one elastic seal. The seal is arranged between the coupling piece and the housing and also between the coupling piece and the pipeline. The seal has projections penetrating into recesses in the housing.

8 Claims, 2 Drawing Sheets

GAS GENERATOR

TECHNICAL FIELD

The invention relates to a gas generator, in particular a tubular gas generator.

BACKGROUND OF THE INVENTION

Gas generators, in the meantime, are arranged not only immediately in the vicinity of their consumer, usually a gas bag, but for reasons of space are also accommodated apart from it in places in the vehicle where more installation room is available. A pipeline provides the connection between gas generator and consumer. The connection between the housing of the gas generator and the pipeline in the form of a coupling piece must ensure a gas-tight sealing between the parts which are connected with each other. For this, it is known to screw the pipeline and the gas generator into corresponding openings in the coupling piece, which is costly with regard to assembly. In addition, the pipe forming the pipeline can also be pressed onto (as known from DE 297 02 011 U1) or welded to the coupling piece. However, in the latter solution, no further modular arrangement is possible, in which pipelines of differing length can also be built in, using the same coupling piece. The gas-tightness between the coupling piece and the gas generator and also the pipeline is important in long pipelines, because a drop in pressure is particularly disadvantageous here. Such long pipelines are, for example, so-called lances which extend along the A-column via the roof frame up to the C-column of a vehicle and inflate a so-called ABC gas bag or window bag, which can cover the side windows of the vehicle in a manner similar to a curtain.

BRIEF SUMMARY OF THE INVENTION

The invention provides a gas generator with a pipeline connected in a gas-tight manner via the coupling piece, the connection of the parts being distinguished by an extreme pressure-tightness. The gas generator according to the invention comprises a housing, at least one pipeline connected to the housing and directing generated gas to a consumer, a coupling piece which connects the housing with the pipeline, and at least one elastic seal. The seal is arranged between the coupling piece and the housing and also between the coupling piece and the pipeline. The seal has projections penetrating into recesses in at least one of the coupling piece, the housing and the pipeline. Thereby it is ensured, on the one hand, that the elastic seal is always in the correct place on assembly and can not be displaced and, on the other hand, does not shift owing to the high pressure when the gas generator is activated.

Preferably, the seal is adapted to the inner contour of the coupling piece and thereby represents a hollow shaped part lining the inner contour. According to the preferred embodiment, the projections protrude into gas outlet openings in the housing.

According to a further embodiment, the invention also provides a coupling piece which is simple and quick to install. This consists of two shells, pressed against each other in a gas-tight manner by connecting elements, which shells clamp between them sections of the housing and of the pipeline. These shells can, for example, be pressed against each other by screw connections or by bent tongues formed on at least one shell.

So that as few individual parts as possible have to be used, provision is made in addition that the shells are integrally connected with each other on a common edge region and the edge region acts as a hinge which permits a folding of the shells apart and together for the mounting of gas generator and pipeline. Through the provision of shells, the advantage is also produced that these can be placed from the outside onto the housing and the pipelines and the elastic seal does not shift.

DETAILED DESCRIPTION OF THE INVENTION

Figure 1:
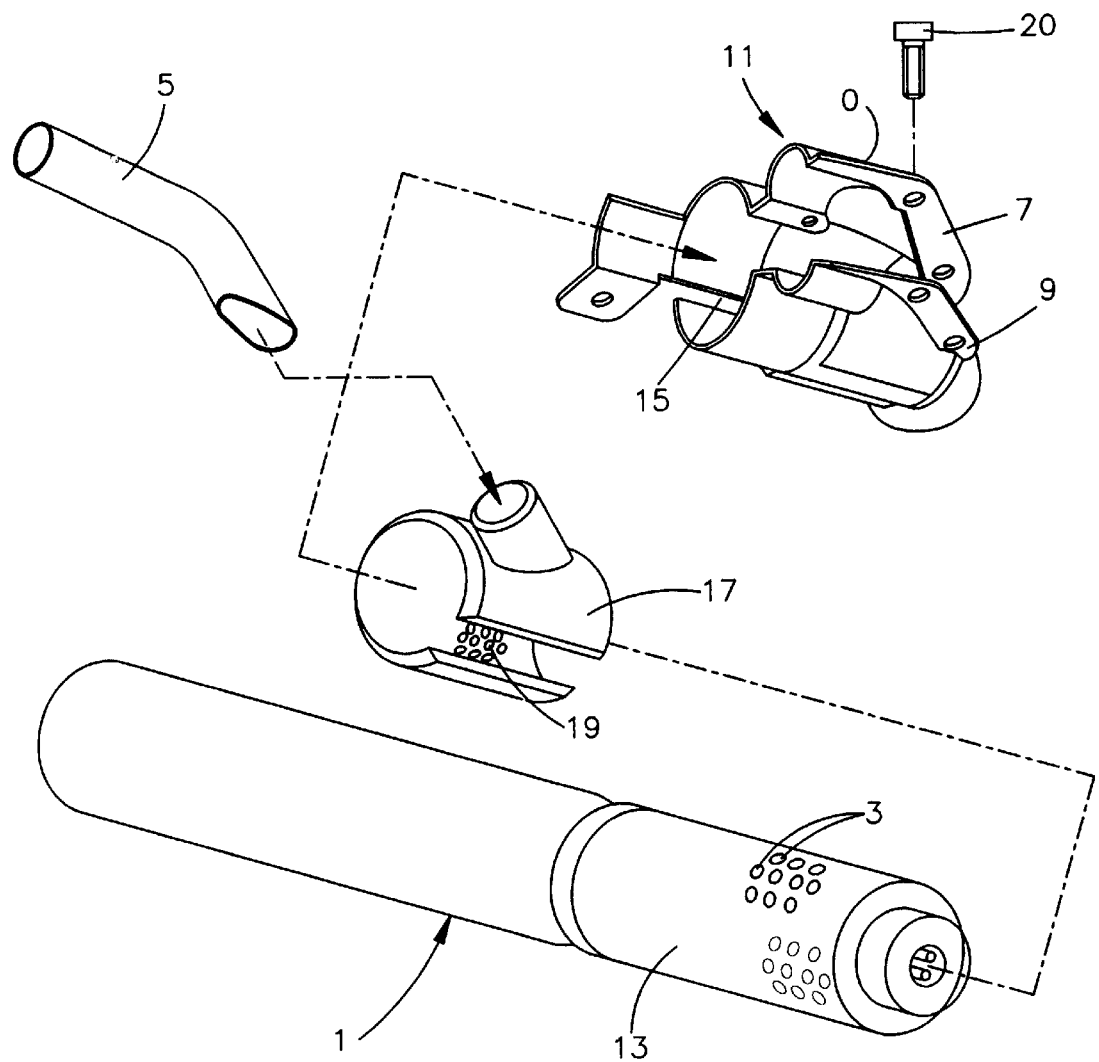
FIGS. 1 and 1a shows a perspective view of a first embodiment, in which the individual parts and also the assembled object are to be seen.
Figure 1A:
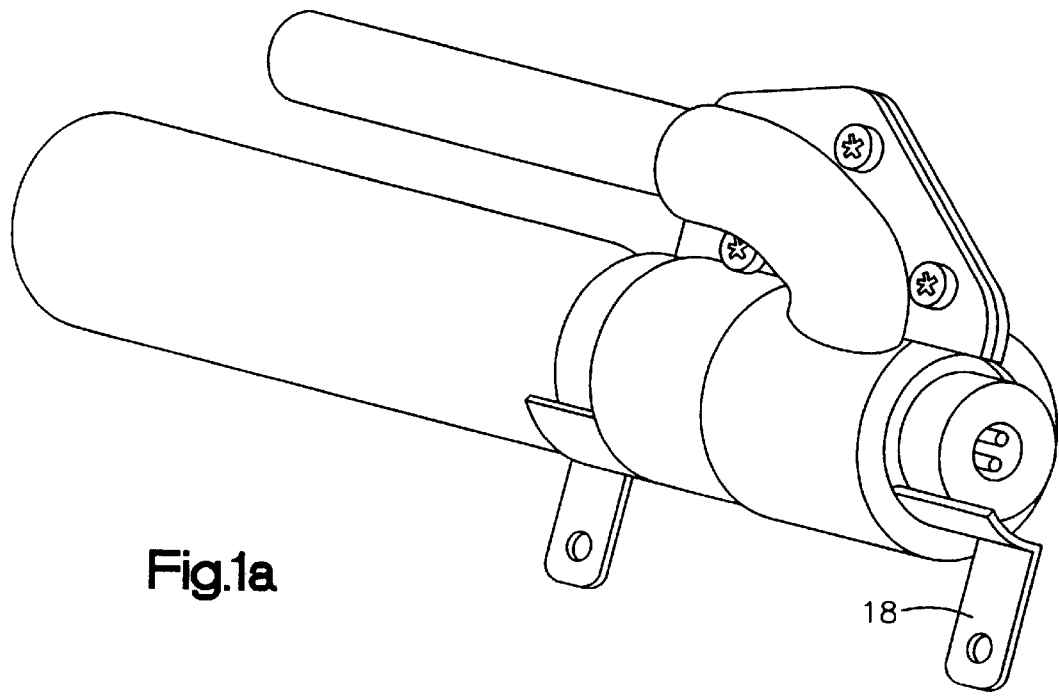

In FIG. 1 a tubular gas generator 1 is illustrated, which has numerous gas outlet openings 3 at an end on the end face. This tubular gas generator serves for the inflating of a so-called ABC gas bag, which has already been previously described and extends from the A-column via the B-column up to the C-column of a vehicle. A pipeline 5, likewise to be seen in FIG. 1, projects into this ABC gas bag. This pipeline 5 is substantially adapted to the form of the A-column and of the roof frame and also of the C-column. The pipeline 5 is connected by a coupling piece 11, consisting of two shells 7, 9, in a gas-tight manner to the housing 13 of the gas generator in the region of the gas outlet openings 3. The two shells 7, 9 are integrally connected with each other at a common edge region 15. The edge region 15 serves as a hinge which permits the folding apart and together of the shells for the simple insertion of the housing 13 and of the pipeline 5. Flanges 18 are also formed on the shells, which flanges 18 serve as fastening flanges for the resulting unit of gas generator 1, coupling piece 11 and pipeline 15 in the vehicle. An elastic, sleeve-like seal 17 is constructed as a hollow shaped body which is adapted to the inner contour of the coupling piece 11. The seal 17 has the form of two tubes running acutely into each other, the part which is placed onto the housing 13 having on its inner face some integrally formed projections 19, which project into some gas outlet openings 13 and serve to secure the seal 17 in position.

The assembly takes place as follows. Firstly, the seal 17, the greater cylindrical region of which is slitted, is placed onto the housing 13. The projections 19 engage into the gas outlet openings 3 so that a type of clip connection is produced. Thereby, also a protection against torsion is achieved for the components with respect to each other and also relative to the seal 17. Then the pipeline 5 is inserted into the opening of the smaller cylindrical section of the seal 17, as indicated by an arrow. The now pre-fixed unit is guided between the spread-apart shells 7, 9. Then the two shells 7, 9 are pressed together by means of connecting elements in the form of screws 20. The seal 17 fills up all intermediate spaces between housing 3, pipeline 5 and coupling piece 11 and is additionally deformed by the shells 7, 9 which are pressed against each other. Thereby, a gas-tight connection is formed between the housing 13 and the pipeline 5, which connection is very simple and quick to install.

The gas generator 1 has several gas outlet openings 3 distributed on its circumference, as already explained. The seal 17 additionally has the purpose that it closes all these outflow openings 3 by corresponding projections 19, which do not lie in the region of the inlet of the finished installed pipeline 5.

Thereby, gas will only arrive into the pipeline 5 via the gas outlet openings 3 which are not closed.

The finished mounted unit can be seen in the center of FIG. 1. This unit is further distinguished by the following further advantages:

The high degree of security against torsion of the parts with respect to each other, no costly processing, with close tolerances being maintained, of the end of the pipeline 5 projecting into the coupling piece 11, and few individual parts.

The connection between gas generator 1 and pipeline 5 remains pressure-tight up to a range between 150 to 300 bar.

The coupling piece 11 is very simple to produce, because it represents a one-piece punched and bent part.

Figure 2:
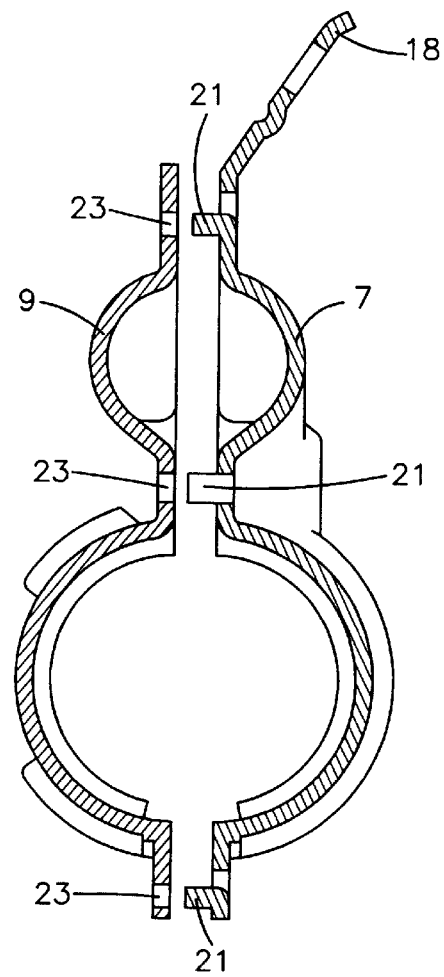
FIG. 2 shows a cross-sectional view through the coupling piece according to a second embodiment of the invention with shells placed against each other which, however, are not yet connected with each other.

In FIG. 2, the parts already explained in connection with FIG. 1 are given corresponding reference numbers. In contrast to the previously explained embodiment, however, the shells 7, 9 are not connected with each other in one piece, but rather they are individual parts. They are secured to each other by lugs 21 punched out from the shell 7 and bent, after the tongues have been inserted through corresponding slits 23 in the shell 9. In FIG. 2, the housing 13 and the pipeline 5 and also the seal 17 can not be seen. In this embodiment, separate connecting elements such as screws are not necessary. As the tongues 21 are only formed on one shell, they only have to be bent from one side, namely from the outer side of the shell 9 after the joining of the shells 7, 9.

What is claimed is:

1. A gas generator comprising:

a housing;

at least one pipeline connected to said housing and adapted to direct generated gas to an airbag;

a coupling piece connecting said housing and said pipeline; and an elastic seal providing a gas tight connection simultaneously between said coupling piece and said housing and between said coupling piece and said pipeline, said seal having projections penetrating into recesses in said housing.

2. The gas generator according to claim 1, wherein said housing has gas outlet openings and said projections project into some of said gas outlet openings.

3. The gas generator according to claim 2, wherein said projections seal some of said gas outlet openings.

4. The gas generator according to claim 2, wherein said coupling piece has an inner contour and said seal is adapted to said inner contour of said coupling piece and forms a hollow shaped part.

5. The gas generator according to claim 1, wherein said coupling piece consists of two shells pressed against each other in a gas-tight manner by connecting elements in the mounted state, which shells clamp between them a section of said housing and of said pipeline.

6. The gas generator according to claim 5, wherein said connecting elements are bent tongues which are formed on at least one shell and engage behind the other shell.

7. The gas generator according to claim 5, wherein said shells have a common edge region, at which they are integrally connected with each other, and wherein said edge region acts as a hinge which permits a folding of said shells apart and together.

8. The gas generator according to claim 1, wherein said gas generator is a tubular gas generator with a cylindrical, elongated housing.

* * * * *